(12) United States Patent
Panigot

(10) Patent No.: US 7,963,531 B2
(45) Date of Patent: Jun. 21, 2011

(54) COLLAPSIBLE UTILITY CART

(75) Inventor: Joseph E. Panigot, Germantown, MD (US)

(73) Assignee: Foldable Stuff, LLC, Germantown, MD (US)

( * ) Notice: Subject to any disclaimer, the term of this patent is extended or adjusted under 35 U.S.C. 154(b) by 490 days.

(21) Appl. No.: 12/196,308

(22) Filed: Aug. 22, 2008

(65) Prior Publication Data

US 2010/0044983 A1    Feb. 25, 2010

(51) Int. Cl.
*B62B 1/12* (2006.01)
(52) U.S. Cl. ............ 280/40; 280/38; 280/39; 280/651; 280/652; 280/47.29
(58) Field of Classification Search .............. 280/30, 280/638, 35, 639, 38, 39, 40, 651, 652, 654, 280/655, 43.24, 47.131, 47.17, 47.18, 47.24, 280/47.26, 47.27, 47.29; 297/129
See application file for complete search history.

(56) References Cited

U.S. PATENT DOCUMENTS

| | | | |
|---|---|---|---|
| 669,222 A | 3/1901 | Ruher | |
| 908,472 A * | 1/1909 | Lyons | 280/40 |
| 1,190,399 A * | 7/1916 | Gates | 280/40 |
| 2,802,672 A | 8/1957 | D'Angelo | |
| 2,970,846 A * | 2/1961 | Boston | 280/40 |
| 3,043,603 A | 7/1962 | Major, Sr. | |
| 3,357,729 A | 12/1967 | Krueger | |
| 3,693,993 A | 9/1972 | Mazzarelli et al. | |
| 4,316,615 A | 2/1982 | Willette | |
| 4,362,308 A | 12/1982 | Hicks et al. | |
| 4,376,547 A | 3/1983 | Dominko | |
| 4,521,054 A | 6/1985 | Deconinck | |
| 4,561,674 A * | 12/1985 | Alessio | 280/655 |
| 4,645,262 A | 2/1987 | Furubotten | |
| 4,659,142 A | 4/1987 | Kuchinsky, Jr. | |
| 4,715,650 A * | 12/1987 | Berman et al. | 297/28 |
| 4,733,905 A | 3/1988 | Buickerood et al. | |
| 4,773,708 A | 9/1988 | Nastu | |
| 5,040,807 A | 8/1991 | Snover | |
| 5,056,804 A | 10/1991 | Wilson et al. | |
| 5,242,189 A * | 9/1993 | Osaki | 280/645 |
| 5,263,727 A | 11/1993 | Libit et al. | |
| 5,330,212 A | 7/1994 | Gardner | |
| 5,364,112 A | 11/1994 | Jackson | |

(Continued)

FOREIGN PATENT DOCUMENTS

EP    1 227 025 A1    7/2002

(Continued)

*Primary Examiner* — J. Allen Shriver, II
*Assistant Examiner* — Vaughn T Coolman
(74) *Attorney, Agent, or Firm* — Edell, Shapiro & Finnan, LLC

(57) ABSTRACT

The present invention is directed toward a collapsible cart adapted for use in recreational areas. The cart includes a body, a support platform, and a first wheel assembly and a second wheel assembly. Each wheel assembly includes a frame and a wheel adapted to slide along the frame. The frame includes a pivot point that reorients wheels from a stowed position to a deployed position. The cart may further include removable fences, as well as a foldable backstop. In use, the cart may be folded from a deployed position, in which it rolls along a surface to transport items, to a stowed position, in which it is collapsed in a compact geometry for storage. The cart may further be integrated into a chair such that the platform provides a seat and a seat back.

24 Claims, 15 Drawing Sheets

U.S. PATENT DOCUMENTS

| | | | |
|---|---|---|---|
| 5,423,592 A | 6/1995 | Spurrier et al. | |
| 5,492,347 A | 2/1996 | Palmeri et al. | |
| 5,669,659 A | 9/1997 | Dittmer | |
| 5,673,928 A * | 10/1997 | Jury | 280/645 |
| 5,803,471 A | 9/1998 | DeMars et al. | |
| 5,887,879 A | 3/1999 | Chumley | |
| 5,971,424 A | 10/1999 | Ingalls | |
| 6,042,128 A * | 3/2000 | Dinkins | 280/47.18 |
| 6,079,777 A | 6/2000 | Simmons et al. | |
| 6,164,683 A | 12/2000 | Kalman | |
| 6,283,496 B1 * | 9/2001 | Dickmann | 280/652 |
| 6,581,945 B1 | 6/2003 | Shapiro | |
| 6,598,898 B2 | 7/2003 | Chu | |
| 6,626,453 B1 | 9/2003 | Theus et al. | |
| 6,663,120 B1 | 12/2003 | Fagerqvist | |
| 6,685,214 B2 | 2/2004 | Gregory | |
| 6,811,180 B1 * | 11/2004 | Molliere | 280/652 |
| 6,845,991 B1 | 1/2005 | Ritucci et al. | |
| 6,874,799 B2 | 4/2005 | Robberson et al. | |
| 6,883,824 B2 | 4/2005 | Yang | |
| 7,172,207 B2 | 8/2008 | Henry | |
| 7,600,765 B2 * | 10/2009 | Tsai | 280/47.18 |
| 7,819,407 B1 * | 10/2010 | Charitun | 280/47.18 |
| 2004/0080143 A1 | 4/2004 | Johnson | |
| 2004/0150195 A1 * | 8/2004 | Robberson et al. | 280/652 |
| 2006/0049614 A1 | 3/2006 | Shamah | |
| 2006/0207831 A1 | 9/2006 | Moore et al. | |

FOREIGN PATENT DOCUMENTS

| | | |
|---|---|---|
| FR | 2 692 859 A1 | 8/2008 |
| WO | 03/049986 A2 | 6/2003 |
| WO | 2006/022614 A1 | 3/2006 |

* cited by examiner

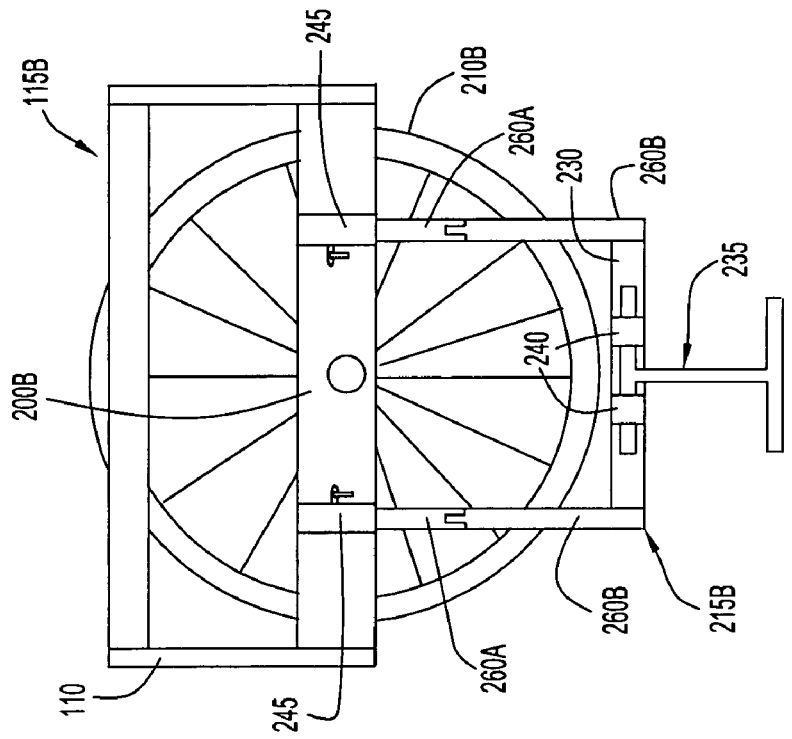
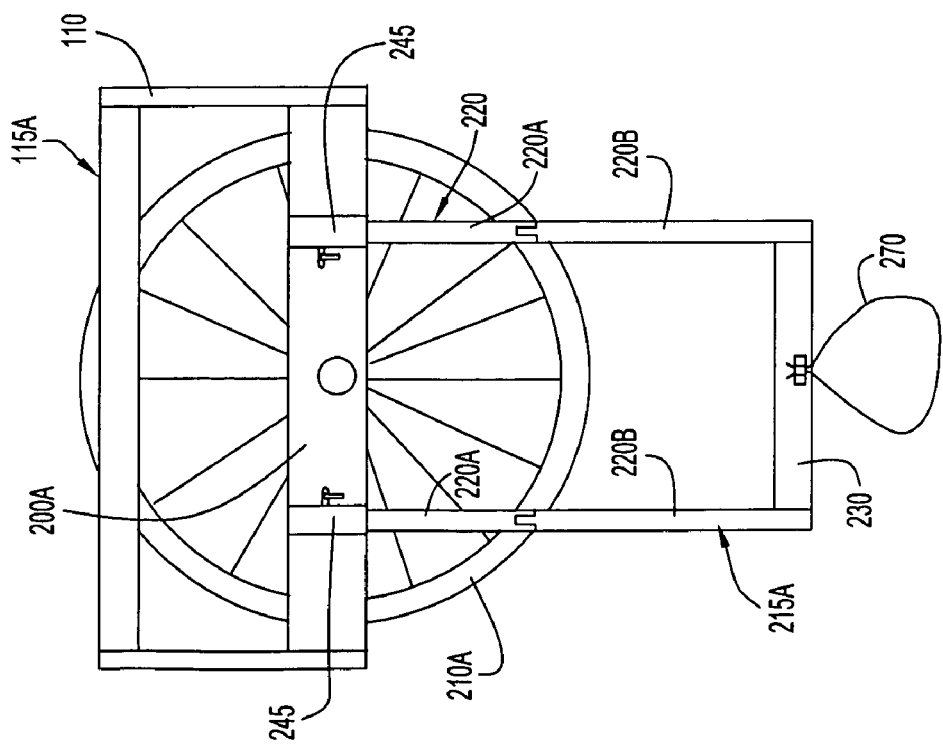

COLLAPSIBLE UTILITY CART

FIELD OF THE INVENTION

This invention is directed toward a collapsible utility cart and, in particular, a cart having foldable wheel assemblies.

BACKGROUND OF THE INVENTION

Previous folding utility carts typically relied on folding, hinged, or retracting panels and/or frames to initially achieve compactness. To lend the necessary rigidity to the cart for transporting or carrying items, the panels or frames were secured by pins, telescoping components or other means. Compactness of these carts was increased by the use of wheel assemblies that could be folded to lay adjacent to each other in the same plane to achieve a flatter configuration. One limitation in the design of these carts is that each increase in the diameter of the wheels results in an increase of the cart's width by double that amount. This reduces the compactness of such carts if large diameter wheels are used. Large diameter wheels, however, are desirable if the cart is to be used on rough, loose or rugged surfaces such as sand, dirt, grass or gravel.

Other known carts rely on offset wheel brackets that are contoured so that the wheel assemblies can partially lie on top of each other. The folded the wheels in this type of cart, however, must lie between the frame members of the cart. As a result, the overall width of the folded cart must be increased by the width or diameter of the frame members and the portion of each wheel assembly that does not contour to the wheel mounted in the adjacent wheel assembly.

Thus, it would be desirable to provide a cart adapted for recreational areas such as beaches, trails, etc. that may be collapsed into a compact configuration for storage.

SUMMARY OF THE INVENTION

The present invention is directed toward a collapsible cart adapted for use in recreational areas. The cart includes a body, a support platform, and a first wheel assembly and a second wheel assembly. Each wheel assembly includes a frame and a wheel adapted to slide along the frame. The frame includes a pivot point that reorients wheels from a stowed position to a deployed position. The cart may further include removable fences, as well as a foldable backstop. In use, the cart may be folded from a deployed position, in which it rolls along a surface to transport items, to a stowed position, in which it is collapsed in a compact geometry for storage. The cart may further be integrated into a chair or chaise lounge such that the platform provides a seat and a seat back.

BRIEF DESCRIPTION OF THE DRAWINGS

FIG. 2A illustrates an isolated view of the first wheel assembly of the car of FIG. 1.

FIG. 2B illustrates an isolated view of the second wheel assembly of the cart of FIG. 1.

FIG. 3 illustrates a rear view of the cart, showing the wheel assemblies in their deployed positions. FIG. 4 illustrates a rear view of the cart, showing wheels repositioned along the wheel frame. FIG. 5 illustrates the cart platform and wheel assemblies in isolation, showing the folding of the wheel assemblies to their stowed positions. FIG. 6 illustrates the cart of FIG. 1 in its stowed position.

Like reference numerals have been used to identify like elements throughout this disclosure.

DETAILED DESCRIPTION OF THE INVENTION

Figure 1:
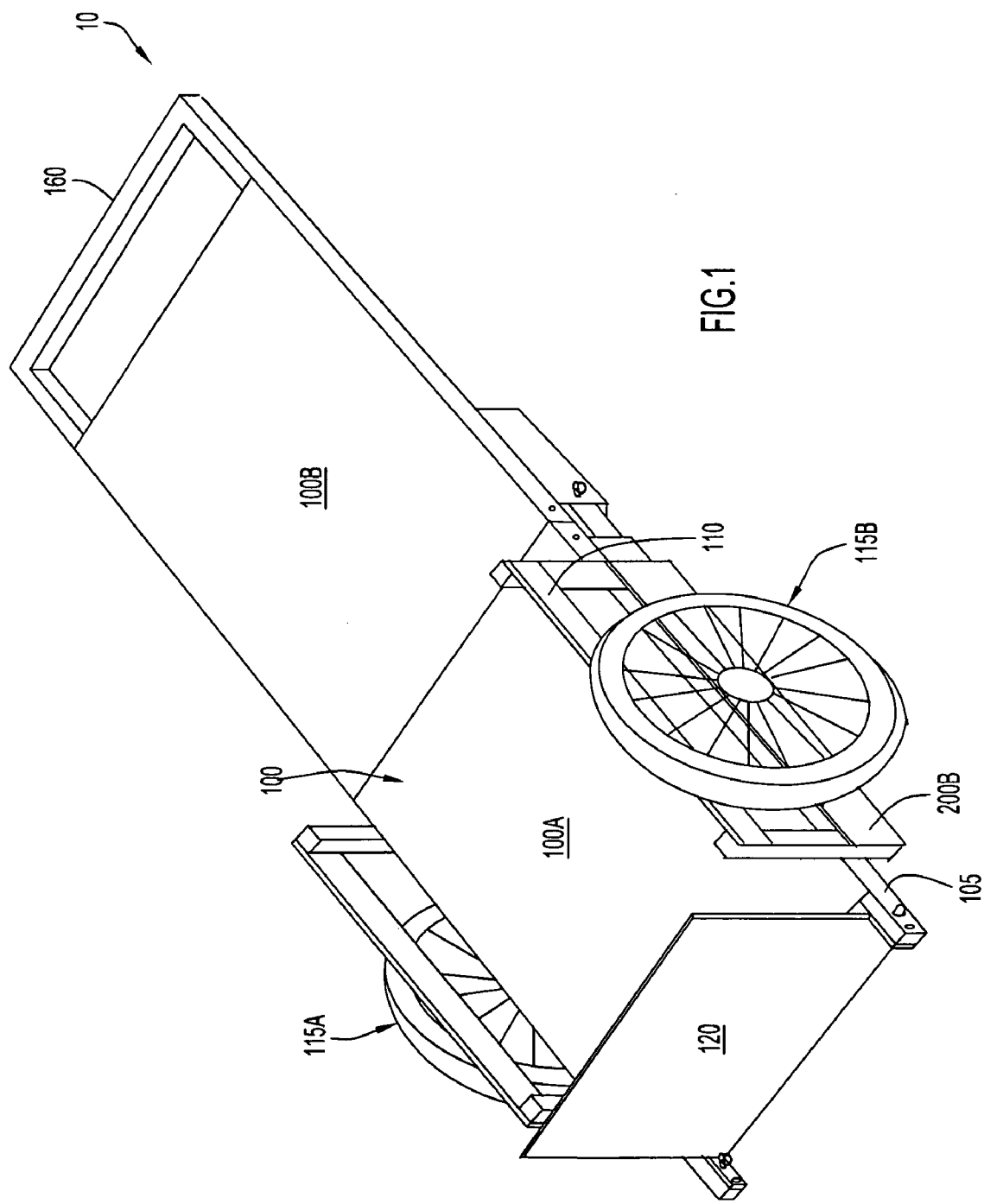
FIG. 1 illustrates a rear perspective view of a collapsible cart in accordance with an embodiment of the invention, showing the cart in its deployed configuration.

FIG. 1 illustrates a rear perspective view of a collapsible cart in accordance with an embodiment of the invention. As shown, the cart 10 includes a support platform 100, a body frame 105, optional fences 110, a first wheel assembly 115A, a second wheel assembly 115B, and a backstop 120. The support platform 100 is adapted to support items requiring transport. For example, the platform may define a generally planar element having a top surface and a bottom surface. The material forming the platform may include, but is not limited to, rigid materials such as wood and plastic, as well as soft-goods material such as cloth, canvas, mesh, etc. By way of specific example, the support platform 100 may be formed by a plurality of flexible plastic strips similar to those utilized in patio and pool furniture.

FIG. 2A is an isolated view of the first wheel assembly 115A. The first wheel assembly 115A includes a first wheel panel 200A with a wheel 210A that is rotatably coupled to the wheel panel via an axle 310 (seen best in FIG. 3).

The axles 310 laterally distance the wheels from the sides of the support platform 100. The lateral distance between the outer sides of the wheel panels 200A, 200B and the wheels 210A, 210B should be sufficient to provide clearance between the wheel panel and the wheels (i.e., to prevent contact/rubbing between the wheels and the wheel panels 200A, 200B). A lateral distance of one inch or less could suffice in this regard. A distance of greater than one inch can also be used. If a portion of the fences 110 will reside between the wheel panels 200A, 200B and the wheels 210A, 210B when the collapsible cart is deployed, the lateral distance between the sides of the wheel panels and the wheels should to be sufficient for the fences 110 to fit between the sides of the wheel panels and the wheels so that the lengths of the fences 110 are parallel to the length of the collapsible cart. The axles 310 must be of sufficient strength without collapsing, folding, buckling or breaking to support the weight of the collapsible cart and any items that will be transported with or placed on it.

The first wheel assembly 115A further includes a foldable wheel frame 215A having one or more rods or leg posts 220. Each leg post 220 includes a proximal leg portion 220A pivotally coupled to a distal leg portion 220B via a pivot joint 225 (i.e., the pivot joint divides the distal/proximal leg portions). By way of example, the pivot joint 225 may be a hinge configured to permit the distal portion 220B to fold approximately 90° with respect to the proximal portion 220A. The distal portion 220B can fold to other angles compared to the proximal portion 220A so long as distal portion 220B does not drag on the ground or otherwise interfere with the operation of the collapsible cart when deployed. Such angles could be less than or greater than 90°. Other types of hinges or pivot mechanisms, such as a living hinge, can be used to enable the distal portion 220B to fold relative to the proximal portion 220A. With this configuration, the distal leg portion 220B pivots/folds with respect to the proximal rod portions 220A.

In the embodiment illustrated, the wheel frame 215 is formed from two leg posts 220 oriented generally parallel to each other. A crossbar or crosspiece 230 may extend between the distal portions 220B of the leg posts. A fastener 270, in turn, may be disposed along the crosspiece 230. By way of example, a flexible loop may be attached to the crosspiece 230. The fastener 270 is configured to mate with a fastener disposed on the second wheel assembly 115B (discussed in greater detail below).

The foldable wheel frame 215A of the first wheel assembly 115A may be coupled directly to the support panel 100. Specifically, the proximal portion 220A of the leg posts 220 may be connected to the bottom surface or the lateral edge of the support platform 100.

The wheel 210A is configured to travel (e.g., slide) along the fold frame 215A. For example, the wheel panel 200A may include one or more sleeves 245 that slidably capture a leg post 220. As a result, the wheel panel 200A may be reoriented along the leg post 220 from the proximal portion 220A of the leg post 220 to the distal portion 220B of the leg post, and vice versa. The crosspiece 230, in addition, to supporting the fastener 270 may provide a stop, preventing the panel 200A from sliding off the leg posts 220.

While the illustrated embodiment includes a wheel panel 200A that slides along two leg posts 220, it should be understood that the wheel panel 200A may be eliminated and the axle directly connected to the sleeve 245 that slides along the leg posts.

FIG. 2B is an isolated view of the second wheel assembly 115B. As with the first wheel assembly 115A, the second wheel assembly 115B includes a wheel panel 200B with a wheel 210B rotatably coupled to the wheel panel 200B via an axle 310 (seen best in FIG. 3). The wheel frame 215B includes one or more rods or leg posts 260 having a proximal leg portion 260A pivotally coupled to a distal leg portion 260B via a pivot joint 225. By way of example, the pivot joint 225 may be a hinge configured to permit the distal portion 260B to fold about 90° with respect to the proximal portion 260A. The distal portion 220B can fold to other angles compared to the proximal portion 220A so long as distal portion 220B does not drag on the ground or otherwise interfere with the operation of the collapsible cart when deployed. Such angles could be less than or greater than 90°. Thus, the distal leg portions 260B of the second wheel assembly 115B pivot/fold with respect to the proximal leg portions 260A.

A crosspiece 230 may extend between the distal portions 260B of the leg posts 260. A fastener 235 adapted to mate with the fastener 270 on the first wheel assembly 115A may be pivotally coupled to the crosspiece 230. By way of example, the fastener 235 of the second wheel assembly 115B may be an H-bar pivotally coupled to the crosspiece 230. An arm of the H-bar may be pivotally or slidably captured by sleeves or pockets 240 formed into the crosspiece 230.

The foldable wheel frame 215B of the second wheel assembly 115B may be coupled directly to the support panel 100. Specifically, the proximal portion 260A of the leg posts 260 may be connected to the bottom surface or the lateral edge of the support platform 100 proximate the panel's perimeter/edge, generally opposite to the wheel frame 215A of the first wheel assembly 115A.

As with the first wheel panel 200A, the second wheel panel 200B is adapted to travel along the fold frame. Specifically, the wheel panel 200B includes sleeves 245 that slidably capture each leg post 260. As a result, the wheel panel 200B may be repositioned along the leg posts 260 from the proximal portion 260A to the distal portion 260B, and vice versa. The crosspiece 230 may function as a stop, preventing the panel 200B from sliding off the leg posts 260.

Figure 5:
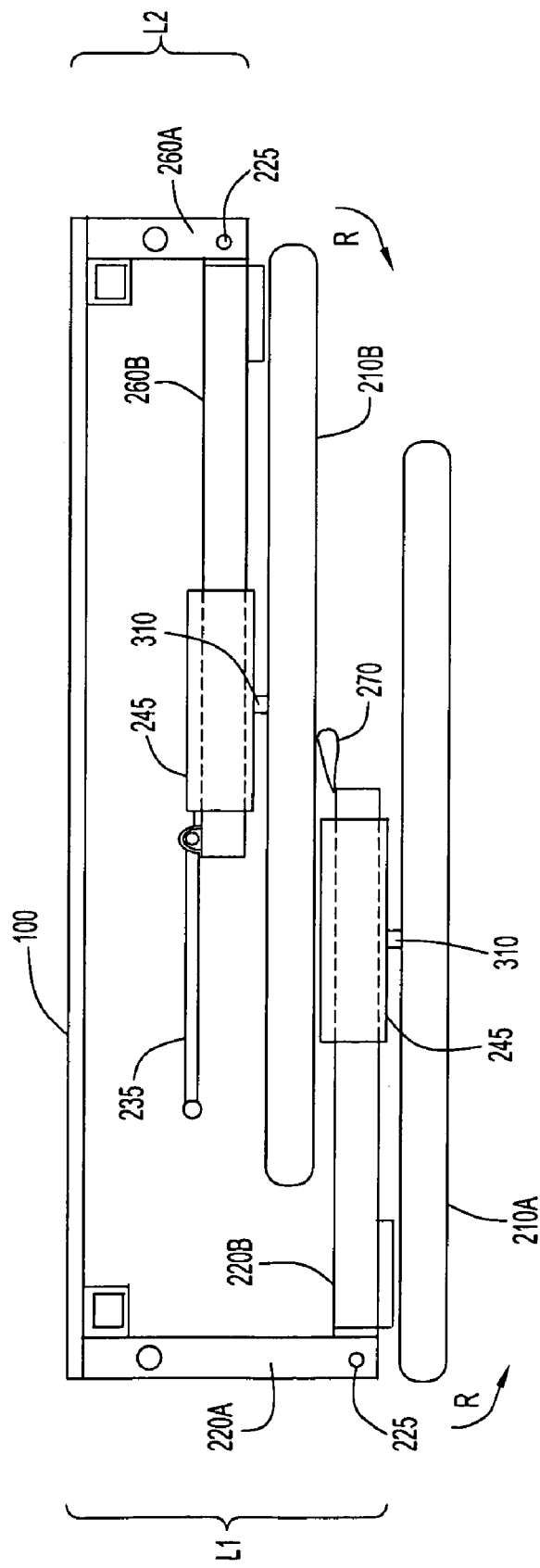

It is important to note that the foldable wheel frame 215A of the first wheel assembly 115A may possess a length that differs from the foldable wheel frame 215B of the second wheel assembly 115B. Referring to FIG. 5, the proximal portion 220A of the first assembly leg post 220 possesses a length L1 that is greater than the length L2 of the proximal portion of 260B of the second assembly leg post 260. This positions the wheels under the support platform 100 at different heights, enabling the stacked/parallel positioning of the wheels 210A, 210B when oriented in their stowed positions (discussed in greater detail below).

By way of specific example, the leg posts 220 of the first wheel frame 215A may extend a distance beyond the leg posts 260 of the second wheel frame 215B at a length that is equal to or greater than the distance needed for first wheel 210A to lie in a plane that is parallel or generally parallel to the plane in which the second wheel 210B lies (when the cart 10 is in its stowed position). Reference to wheels 210A, 210B as lying in "parallel" planes indicates that there is no intersection of the planes of wheels 210A, 210B when the cart 10 is in its stowed (folded) position. Reference to wheels 210A, 210B as lying in "approximately parallel" planes means that the angle of intersection between the planes of wheels 210A, 210B (when the cart 10 is in its stowed position) is about 20° or less, preferably about 10° or less, and even more preferably about 5° or less.

L1 and L2 may possess and shape and dimensions suitable for their intended purpose. By way of example, the length of L2 could minimally include the diameter of the hole in proximal leg portion 260A into which fastening pin 300 is inserted and an area of proximal leg portion 260A that is sufficient to maintain fastening pin 300 in place and support fastening pin 300 and proximal leg portion 260A without collapsing, folding, buckling or breaking. The length of L2 may also include the thickness of distal leg portion 260B. By way of specific example, if material such as steel or aluminum is used, the length of L2 could be less than one inch, one to two inches or more than two inches. The length of L1 could minimally include the length of L2, the thickness of wheel 210B and the length of axle 310 to the extent it extends beyond the lower end of proximal leg portion 260A. The length of L1 may also include the thickness of distal leg portion 260B. By way of specific example, if material such as steel or aluminum is used, the length of L1 could be less than two inches, two to four inches or more than four.

With this configuration, the distal portions 220B, 260B of each wheel assembly 215A, 215B are adapted to pivot/fold with respect to the proximal portions 220A, 260A. In addition, the wheel panel 200A, 200B (and thus the wheel 210) can move from its deployed position, in which the wheel 210A, 210B is positioned within the proximal portions 220A, 260A and oriented generally perpendicular to the supporting surface S (e.g., the ground), to its stowed position, in which the wheels 210A, 210B are positioned within the distal portions 220A, 260A and are oriented parallel (or generally or approximately parallel) to each other. In either position, the wheels 210A, 210B (via the sleeves 245) may be locked in place utilizing conventional fasteners such as pin fasteners, VALCO buttons, etc.

Figure 3:
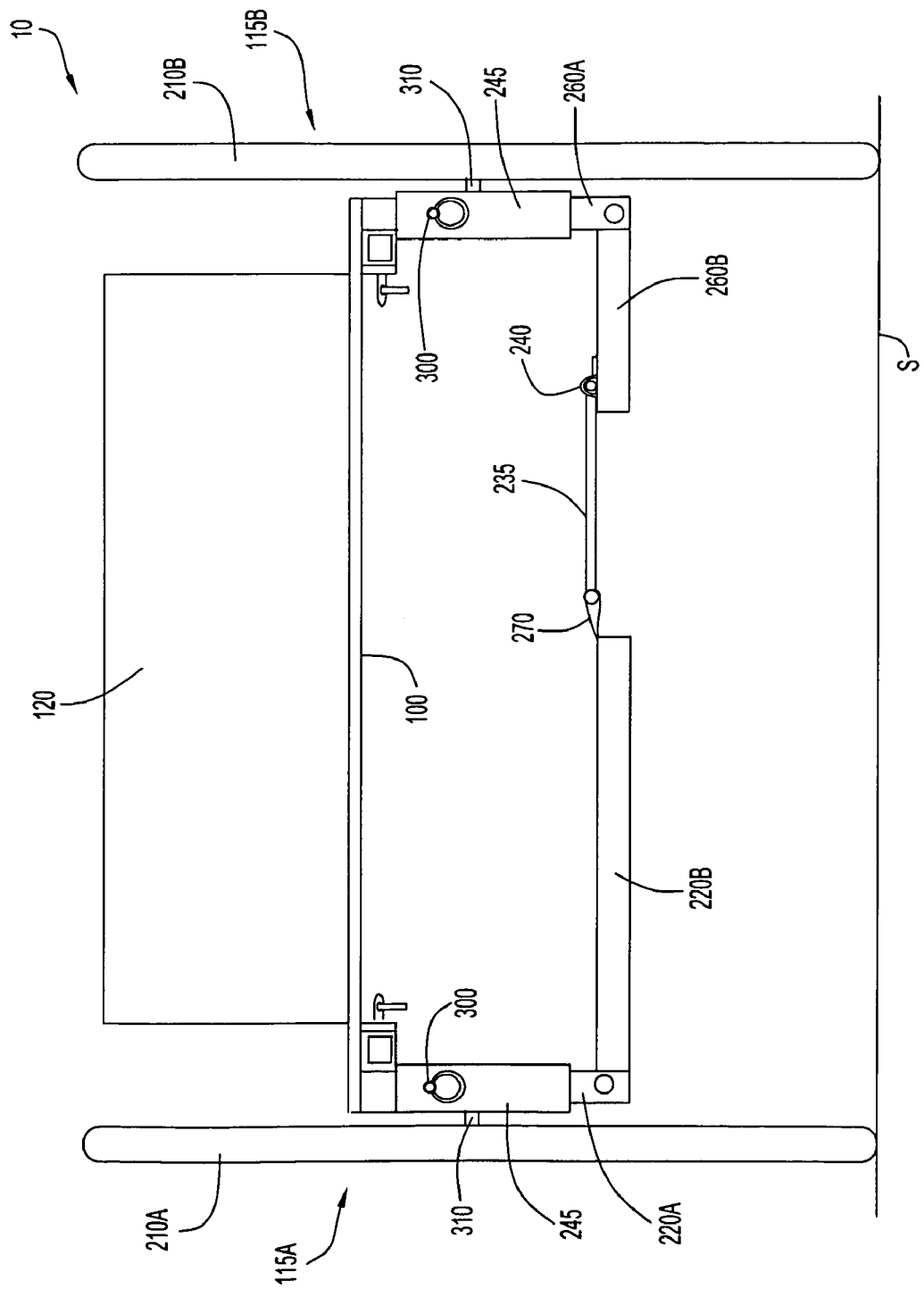
FIGS. 3-6 illustrate the operation of the collapsible cart from a deployed configuration to a collapsed/stowed configuration. Specifically.

The operation of the fold mechanism is explained with reference to FIGS. 3-6. The cart 10 begins in its first, deployed position (FIG. 3). In this position, the wheels 210A, 210B (and thus the wheel panels 200A, 200B) are positioned within their respective proximal portion 220A, 260A of the leg posts 220, 260. The distal portion 220B, 260B of the leg posts, moreover, are pivoted approximately 90° with respect to their respective proximal leg portions 220A, 260A, orienting the distal and proximal portions generally transverse to each other.

The distal leg portions 220B, 260B are secured to each other via the mating fasteners (the H-bar 235 and the loop 270) disposed along the crosspieces 230. That is, the end of the H-bar 235 is threaded through loop 270 to keep the distal leg post portions 220B, 260B from dragging on the ground when the folding utility cart is in use. Alternatively, the hinge 225 may be configured to detent in folded and unfolded positions, stabilizing the distal portion 220B, 260B of the leg posts 220, 260 in the desired orientation.

The sleeves 245 (and thus the wheels 210A, 210B), moreover, may be secured in place via a fastening pin 300 extending through holes formed in the sleeve 245 and the leg posts 220, 260. In the deployed position, the wheels 210A, 210B are oriented generally perpendicular to a supporting surface S, rotating about their respective axles 310 and permitting items to be transported. Other fastening mechanisms may be utilized to secure the sleeves in a desired position along the leg posts 220, 260. For example, VALCO tabs, wing nuts, spring-loaded levers, etc. may be utilized.

Figure 4:
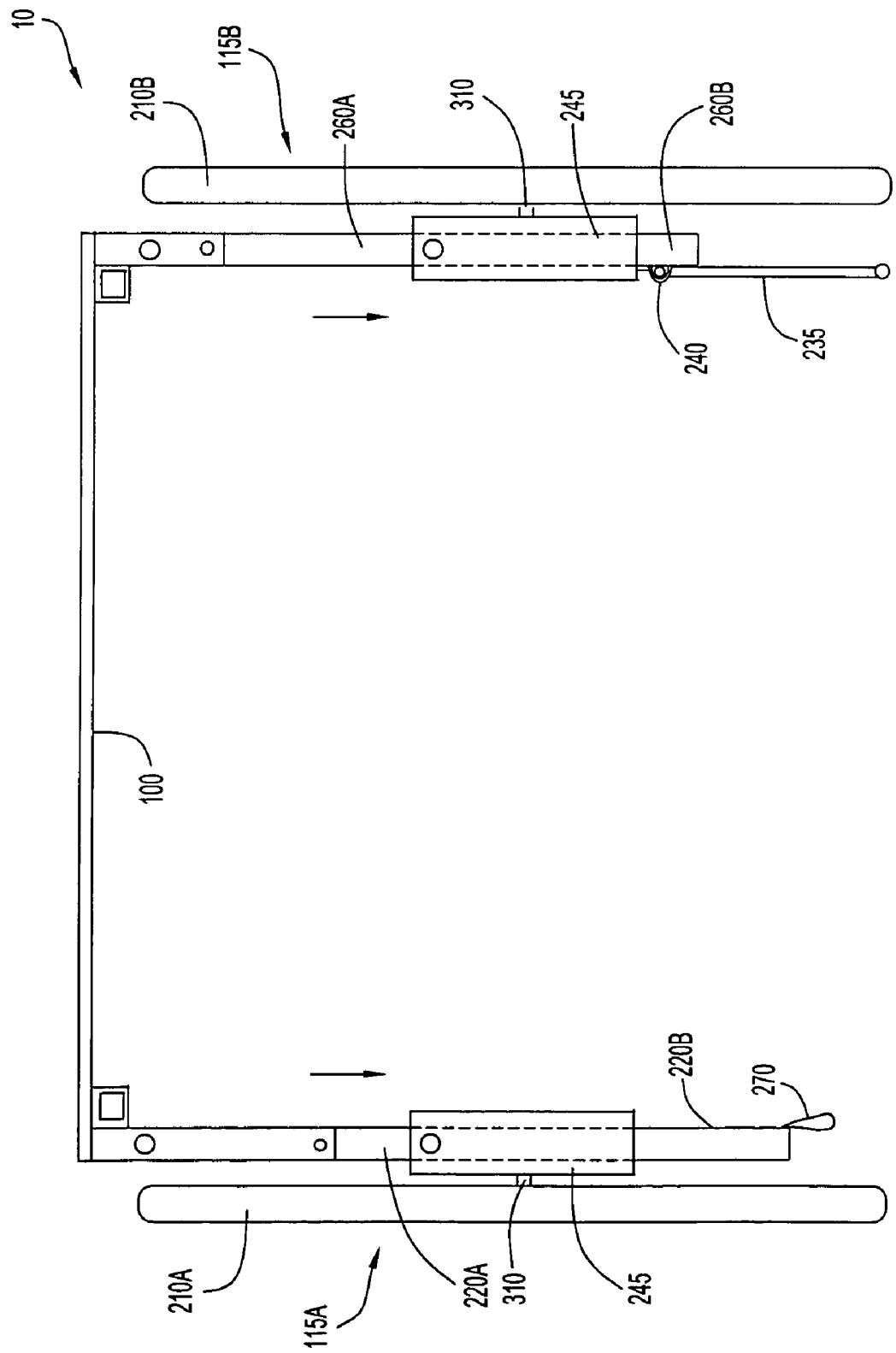

Referring to FIG. 4, the complementary fasteners 235, 270 are disconnected and the distal portion 220B, 260B of the leg posts 220, 260 are pivoted downward until the proximal 220A, 260A and distal portions of the leg posts are generally aligned. The wheels 210A, 210B are then slid distally along the leg posts 220, 260 until the sleeves 245 are positioned within the distal portion 220B, 260B of the leg posts 220, 260.

Figure 6:
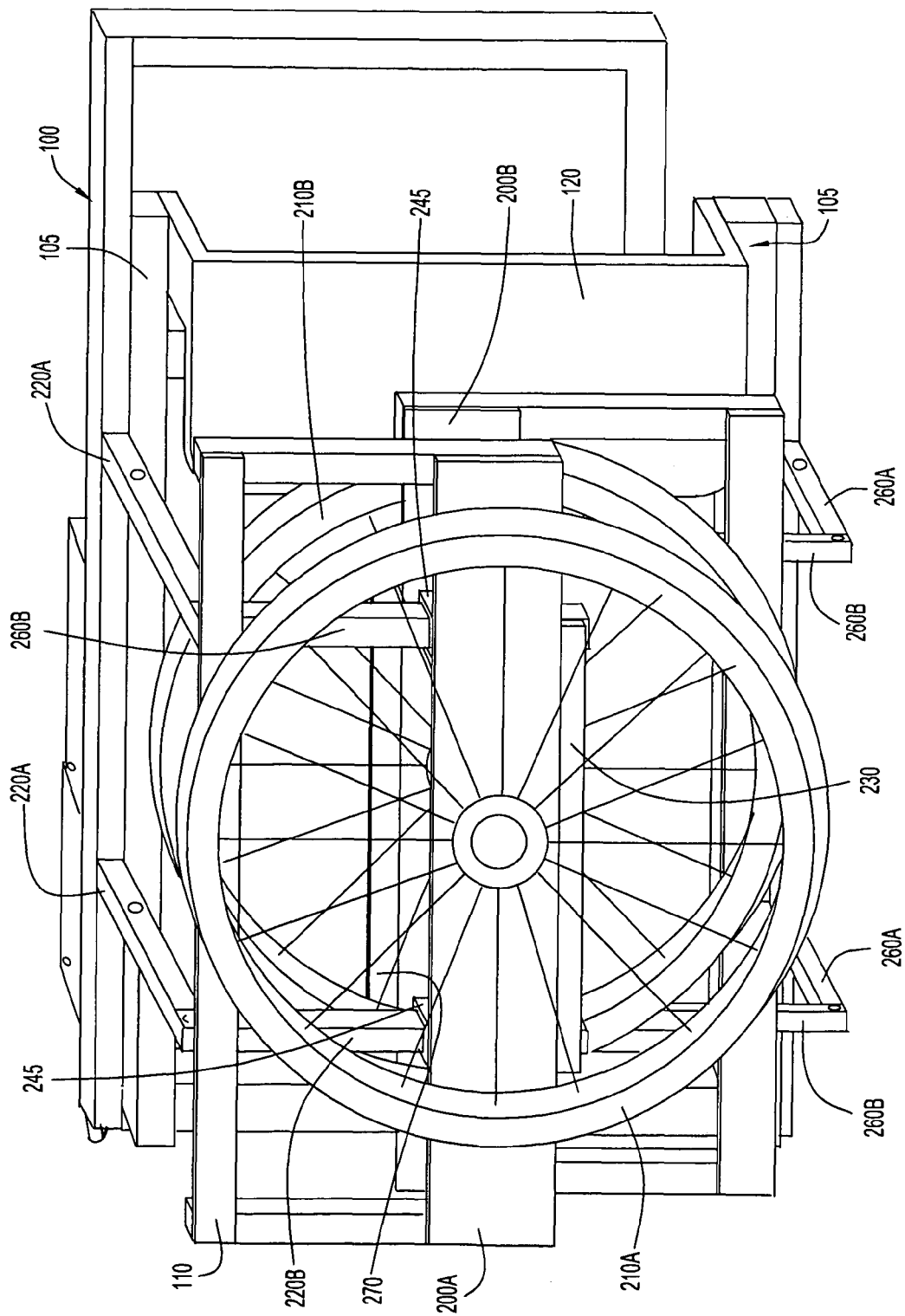

Referring to FIG. 5, to place the wheel assemblies in their stowed positions, the distal portions 220B, 260B are then rotated about the hinge 225 to orient the wheels 210A, 210B generally parallel to the support platform 100. In addition to being generally parallel to the support platform 100, the wheels 210A, 210B are also oriented generally parallel to each other, along separate (parallel) planes, as described above. The cart 10 in its stowed position is illustrated in FIG. 6.

To unfold the wheel assemblies for use, the user folds each of distal leg portions 220B, 260B downward, away from the support platform 100. The leg sleeves 245 are slid over the proximal portion 220A, 260A of the leg posts 220, 260 until, for example, a leg hole and a sleeve hole are aligned. A fastening pin is then inserted into the aligned sleeve and leg post holes, securing the sleeves 245 to the leg posts 220, 260, locking the sleeve 245 in place.

Figure 7:
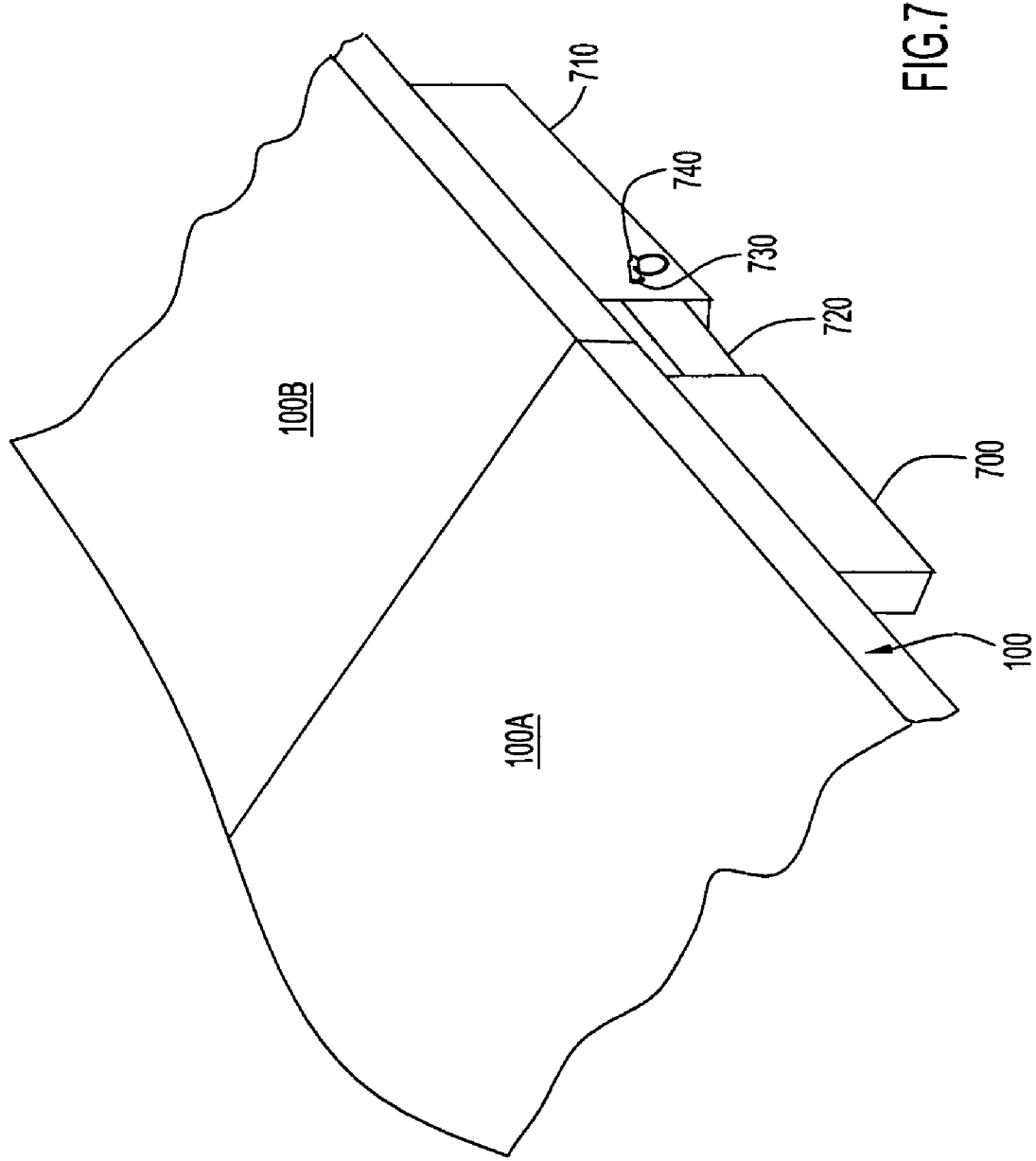
FIGS. 7-9 illustrate a partial view of the support platform shown in FIG. 1, showing the folding of the support platform from a deployed to a stowed configuration.
Figure 8:
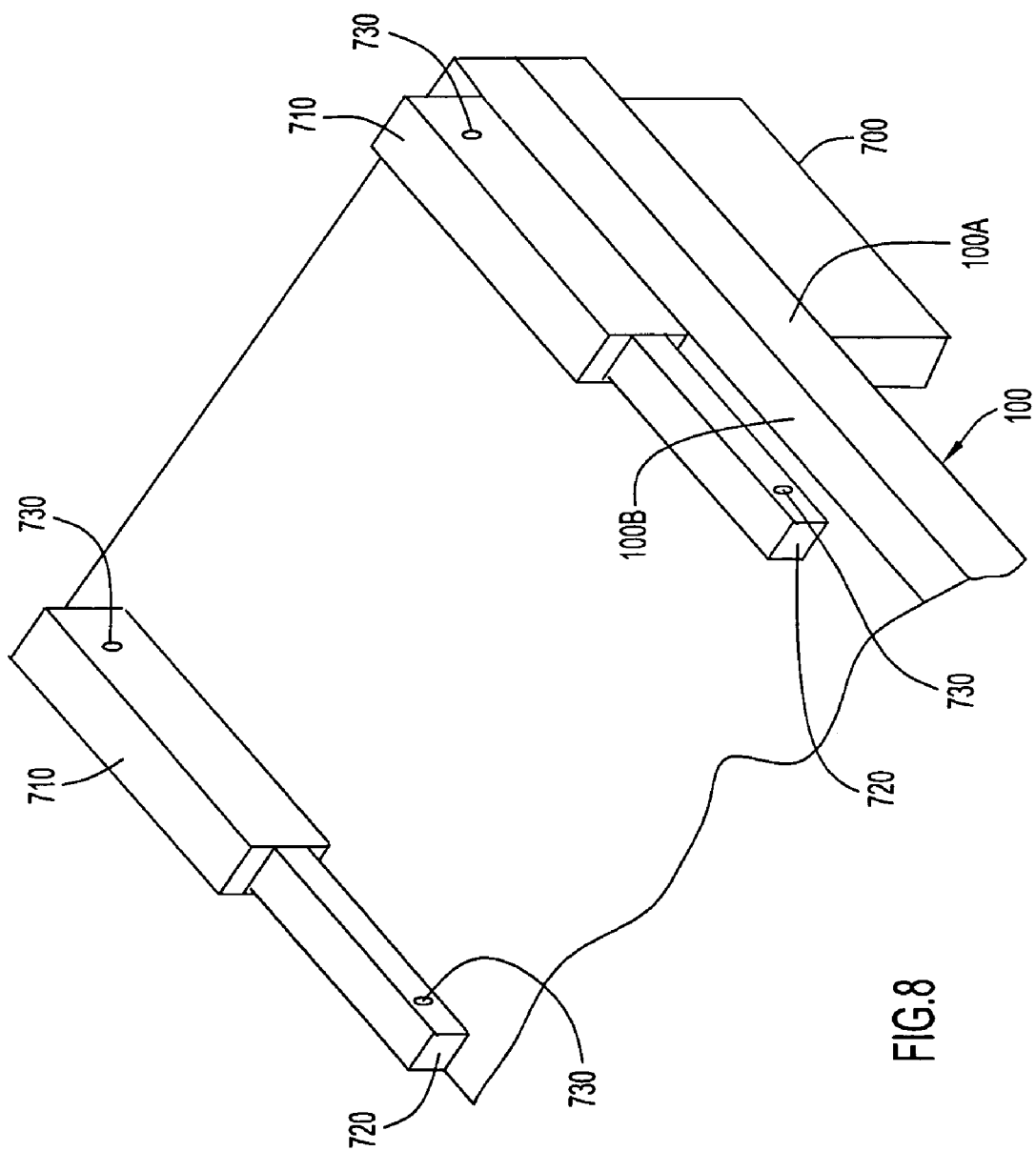
Figure 9:
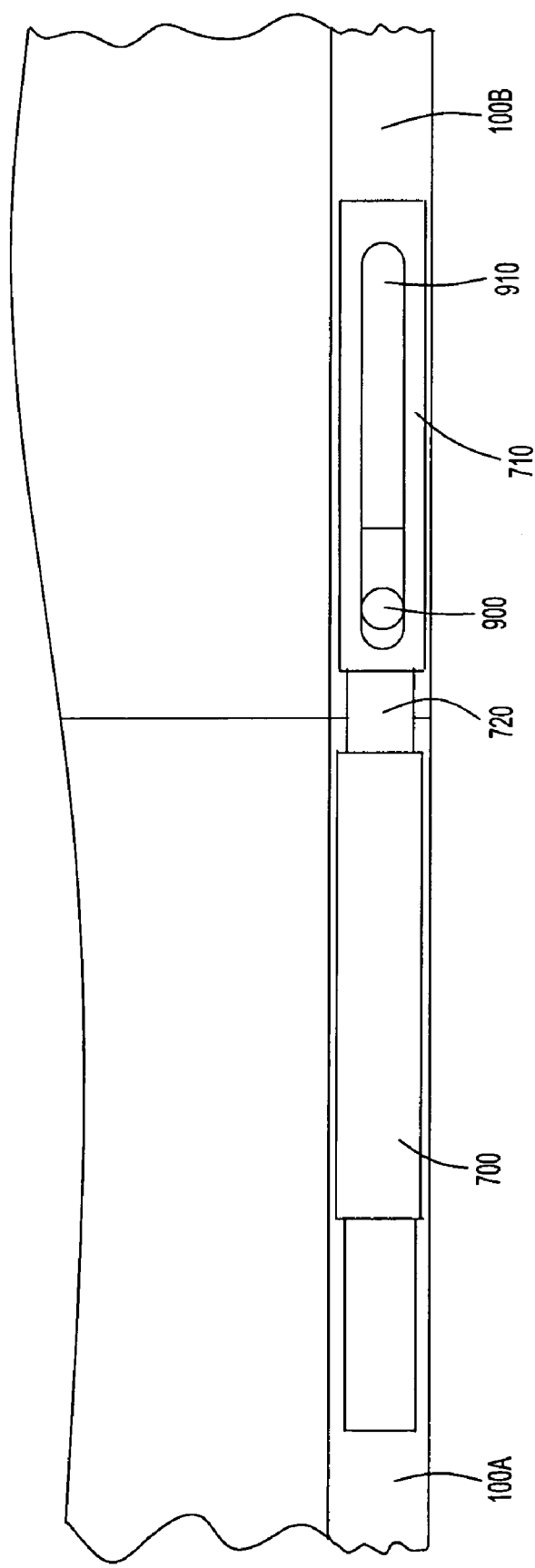

The support platform 100 may be a single platform, or may include two or more folding sections. Referring back to the embodiment of FIG. 1, the support platform 100 may include a first platform section 100A pivotally coupled to a second platform section 100B. The sections 100A, 100B may be adapted to fold from a deployed configuration to a stowed configuration. FIGS. 7-9 show the fold mechanism for the support platform 100 in accordance with an embodiment of the invention. As shown, the underside of the first platform section 100A includes a first tube 700 that is aligned with a second tube 710 disposed on the second platform section 100B. A sliding shaft 720 is configured to move from a disengaged position, in which the shaft is housed within the first tube 700, to an engaged position, in which the shaft bridges the first tube 700 and the second tube 710. In the disengaged position, the platform sections 100A, 100B may be pivoted with respect to each other. Specifically, the second platform section 100B may be rotated from its deployed configuration, in which the second section generally aligned along the same plane with the first platform section 100A, to its stowed configuration, in which the second platform section is oriented on top of the first platform section (or vice versa) (FIG. 8).

The tubes 700, 710 may further include slits and/or holes on their undersides and lateral sides to allow grit, dirt, sand or other debris that may collect in the tubes to be forced out when the shaft 720 moves (preventing the clogging/jamming).

In the engaged position, the shaft 720 prevents the pivoting of the platform sections 100A, 100B, securing the support platform 100 in its deployed position.

The shaft 720, moreover, may be secured in place via a securing mechanism. By way of example, the second tube 710 and the shaft 720 may include one or more apertures 730 configured to align when the shaft is properly oriented in the engaged position. Once aligned, the apertures 730 receive a fastening pin 740. The apertures 730 may possess any shape and dimensions suitable for its intended purpose. In addition, the number and location of the apertures 730 is not limited to that illustrated, and may be oriented anywhere along the tubes 700, 710 and shaft 720. Similarly, the number and location of fastening pins 740 is not limited to that illustrated.

The cross section of the tubes 700, 710 and the shaft 720 may include, but is not limited to, square or rectangular cross sections. In addition, the tubes 700, 710 and shaft 720 may be configured such that rotation of the shaft 720 within the tubes is prevented.

The shaft 720 may further include a gripping member 900 for manipulating the latch and orienting it in its engaged and disengaged positions. Referring to FIG. 9, the second tube 710 includes an elongated slot 910 along which the gripping member 900 travels. In operation, a user engages the gripping member 900, sliding the shaft 720 back and forth to position the shaft in its engaged and disengaged positions.

Once the cart 10 has been folded up for storage, it may be secured to prevent the cart from inadvertently unfolding while stowed. For example, the cart 10 may include straps attached, buckles, or other fastening means that, when fastened, maintain the cart 10 as a compact unit.

The fences 110 function as containment walls, preventing items being transported from falling off the support platform 100 of the cart 10. The fences, moreover, may also serve as arm rests or hand rails (e.g., when the collapsible cart is utilized as a chair or chaise lounge). The fences 110 may be coupled to or made integral with the wheel attachment panel 200A, 200B. Consequently, the fences 110 move with the panel 200A, 200B and the wheels 210A, 210B as the panels slide along the leg posts 220, 260, as well as when the distal portion 220B, 260B are of the leg posts are pivoted. FIG. 6 illustrates the fences 110 in the stowed position.

Alternatively, the fences 110 may be coupled to the proximal portion 220A, 260A of the leg posts 220, 260, or may selectively couple directly to the support platform. The fences 110 may be formed from material including, but not limited to, cloth, plastic strips, mesh, etc. In addition, dividers may be positioned between the fences 110 (perpendicularly to the fence lengths) to prevent the items being transported from rolling or moving around (not illustrated). The fences are optional, thus may be excluded from the cart 10 if desired.

Figure 10:
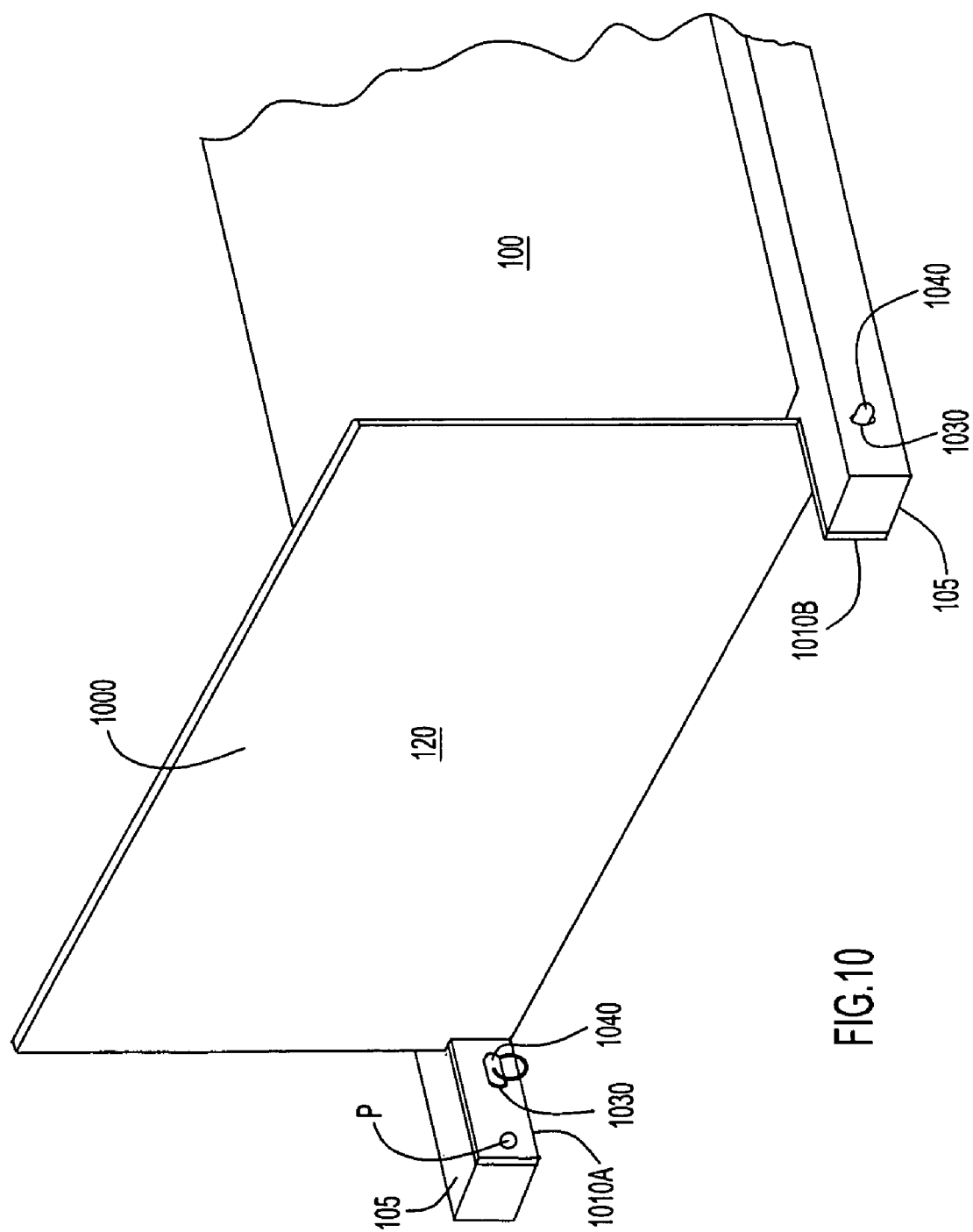
FIGS. 10-13 illustrate the backstop of FIG. 1, showing the rotation of the backstop from a deployed position to a folded position, as well as locking mechanisms according to embodiments of the invention.
Figure 11:
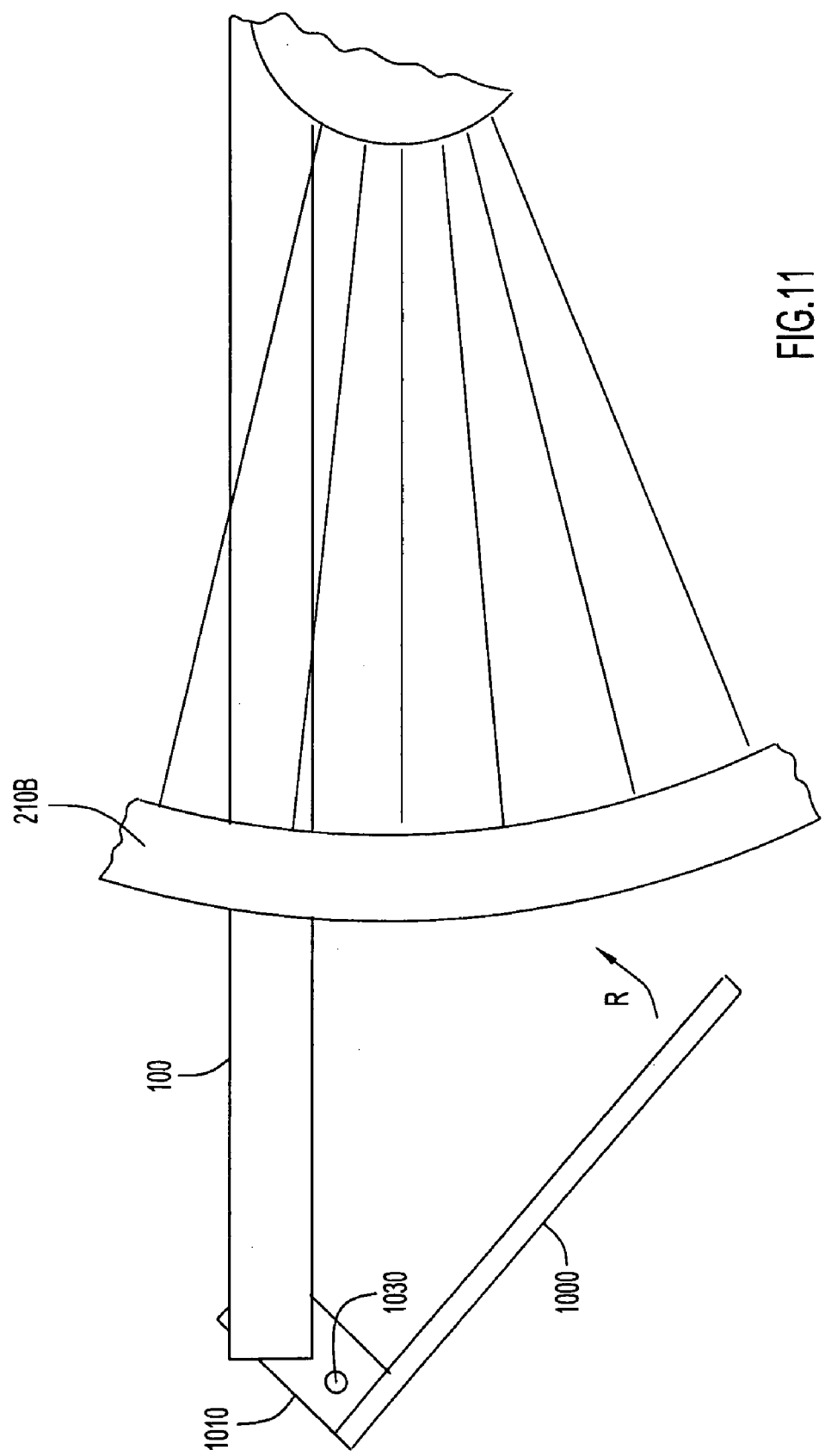

Referring back to FIG. 1, the cart 10 may further include a backstop repositionable with respect to the support platform 100 from a deployed configuration to a stowed configuration. In the stowed position, the backstop may be oriented generally parallel to the platform. In the deployed position, the backstop may be oriented generally perpendicular to the support platform. FIG. 10 illustrates a close-up view of the backstop 120 in accordance with an embodiment of the invention. As shown, the backstop 120 includes a backstop wall 1000 and two plates or feet 1010A, 1010B extending from the wall 1000. By way of example, the plates 1010A, 1010B are attached to or contiguous with the backstop wall 1000 on its lower corners, projecting generally perpendicularly to the plane of backstop wall.

The plates 1010A, 1010B, moreover, are pivotally coupled to the support platform 100 such that the plates pivot about pivot point P. For example, the plates may connect to arms extending rearward of the support platform. With this configuration, the backstop 120 rotates (indicated by arrow R) from a first, deployed position, in which the backstop wall 1000 is oriented generally perpendicular to the support platform (FIG. 10) to a second, stowed position, in which the backstop wall 1000 is oriented generally parallel to the support platform 100, preferably contacting the lower surface of the support platform.

The backstop 120 may be secured in the deployed of stowed positions utilizing conventional fasteners. For example, the plates 1010A, 1010B may have holes 1030 that aligned with holes formed into the support platform 100 into which a fastening pin 1040 is inserted. Alternatively, other fasteners such as VALCO buttons may be utilized.

Figure 12:
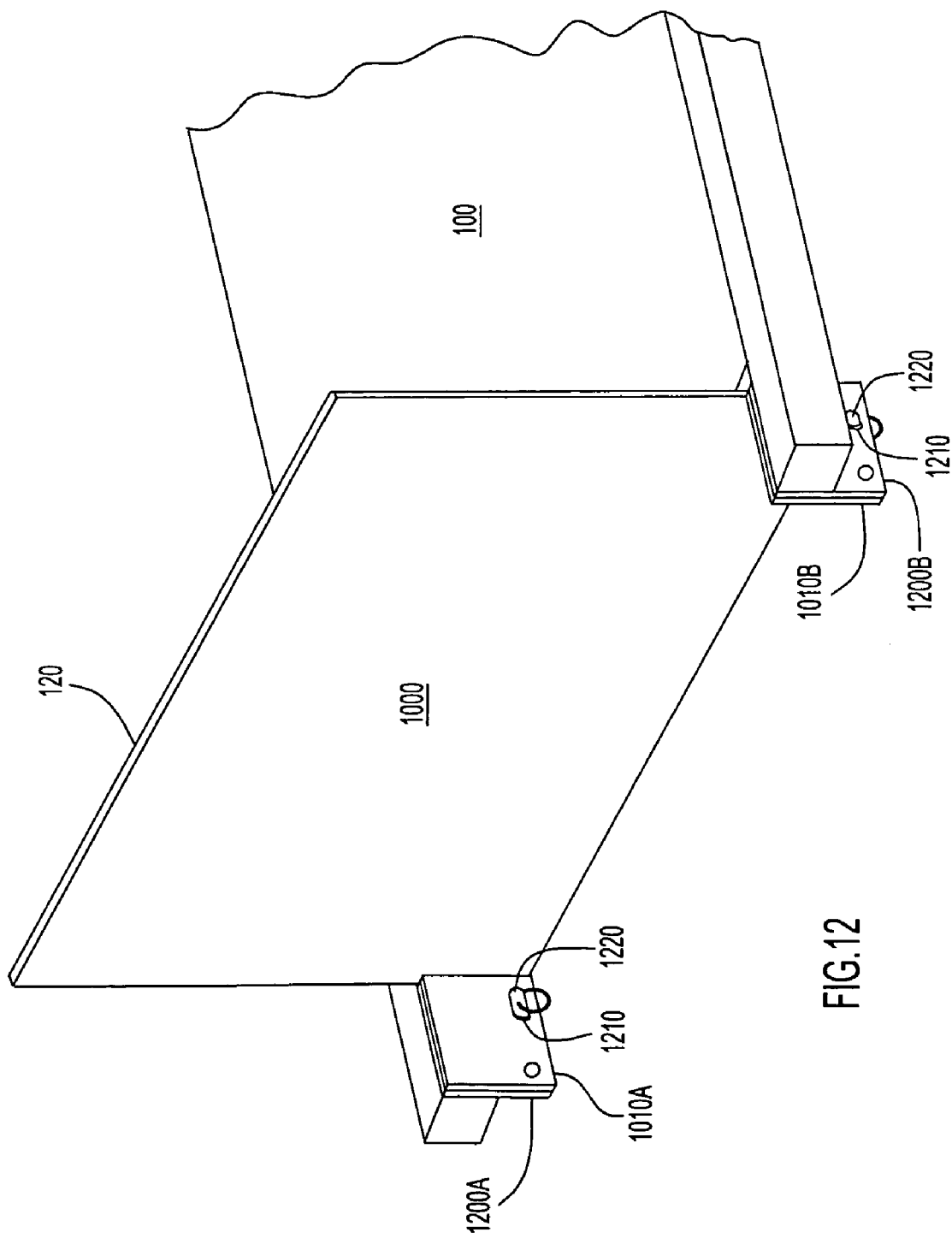

An alternative embodiment of the backstop 120 is illustrated in FIG. 12. As shown, the backstop includes plates 1010A, 1010B that are pivotally coupled to tabs 1200A, 1200B mounted on the support platform 100. The bottom edges of the plates 1010A, 1010B and tabs 1200A, 1200B extend below the support platform 100. Each tab 1200A, 1200B and plate 1010A, 1020B, moreover, includes aligned holes 1210 located below the support platform 100. To secure the backstop 120, a fastening pin 1220 is inserted into aligned holes 1210. This embodiment offers the advantage making it easier for the user to see when the holes 1210 are aligned. When the cart 10 is to be folded up for storage, the pins 1220 can be removed and backstop 120 rotated so that it lays flat or parallel against the underside of support platform 100.

Figure 13:
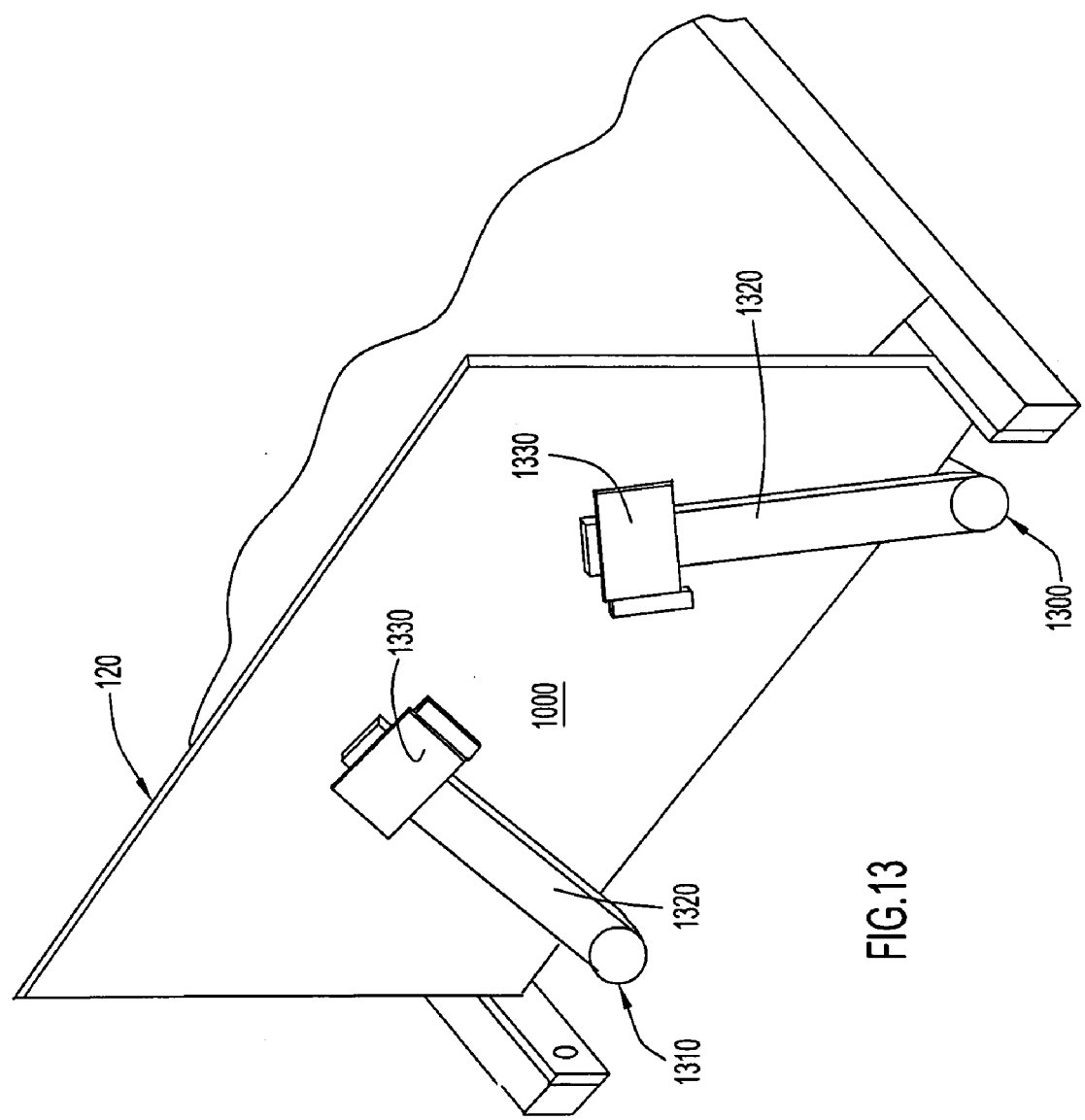

An alternative embodiment of the backstop 120 is illustrated in FIG. 13. As shown, a first rod 1300 and a second rod 1310 are attached to the support platform 100 such that their lengths are generally perpendicular to the plane of backstop 120 when unfolded for use. Each rod 1300, 1310 includes a foot 1320 attached to its end. The rods 1300, 1310 are attached to the support platform 100 such that the rods spin freely along their longitudinal axes and so that when feet 1320 are aligned, their lengths lie beyond the edge of support platform 100 in a plane that is parallel to the edge of the support platform.

The backstop 120, moreover, is pivotally mounted to support platform 100 in a manner that permits the backstop to be rotated so it can lay flat on one or either side of support platform (its upper or lower surface) without hitting the feet 1320 when rods 1300, 1310 are rotated to make the least possible distance between the ends of feet 1320. Slots or tabs 1330 are located on either side of backstop wall 1000 so that the feet 1320 can engage the slots 1330 by rotating the rods 1300, 1310 appropriately when the backstop wall 1000 is generally perpendicular to support platform 100. The slots 1330 are further located so that the feet 1320 will continue to rest in and engage them when the folding utility cart is in use.

A securing mechanism may be included to prevent the rods 1300, 1310 from rotating once the feet 1320 engage the slots 1330. The securing mechanism may include a pin that fits into a hole in the members that attach the rods 1300, 1310 to the frame of support platform and a hole in each of rods 1300, 1310 when the holes are aligned. In one embodiment, the rods 1300, 1310 are also slidably connected to the support platform 100 so that the feet 1320 can be moved back and forth to avoid the backstop 120 when it is pivoted. For storage of the cart, the feet 1320 are disengaged from the slots 1330, and the feet 1320 are rotated so that backstop 120 can be folded to lay flat against or parallel to the side of support platform.

The cart 10 may be integrated into other devices such as a garden cart, a wheelbarrow, a hand truck, a golf cart, etc. In the garden cart embodiment, the cart 10 is capable of transporting branches and other debris. The cart 10 may include additional securing devices such as buckles, clips, snaps, or straps on the fences 110 to secure the fence to the backstop 120 so that there is no gap between the fences 110 and the backstop. In addition, the backstop 120 would preferably be as high as or higher than the fences 110. In some embodiments of the garden cart, the cart fences 110 and/or backstop 120 may be omitted, and the walls directly attached to the support platform 100. Such walls could collapse or fold to make the garden cart more compact. A cover may further be provided to the cart that couples to the fencing 110 to keep the items being transported from falling off during use.

In the wheelbarrow embodiment, the backstop 120, when deployed, would point away from the cart so that an angle between the backstop 120 and the front of the wheelbarrow is less than ninety degrees. This would form a sloping surface that allows the material being transported with the wheelbarrow to be dumped out easily in front of it. The wheelbarrow may include additional securing devices (such as buckles, clips, snaps or straps) on the fences 110 to secure them to the backstop 120 so that there is no gap between the fences 110 and the backstop. In this embodiment, the backstop 120 would preferably be as high as or higher than fences 110. In some embodiments of the wheelbarrow, the fences 110 and/or backstop may be omitted, and the walls directly attached to support platform 100. Such walls could collapse or fold to make the wheel barrow more compact.

In another embodiment, the collapsible cart 10 described herein could serve as a hand truck. Such embodiment would have the same wheel assemblies 115A, 115B as described in previous embodiments except that the dimensions of the wheels 210A, 210B would be configured to orient the top of the wheels below the upper surface of the support platform 100. A U-shaped bar 160 (FIG. 1) or other extension may be attached or fold out from the second platform section 100B to serve as a means to hold the end of the folding utility cart when it is being used as a hand truck.

The platform sections 100A, 100B may include fasteners to secure items to the support platform 100. For example, the platform sections 100A, 100B could be shaped to fit the general contours of the item being transported, the platform sections may include ribs that project perpendicularly from to keep the items from falling or rolling of the sides of the platform sections, or may include adjustable belts that can be tightened to hold an item against platform sections. This embodiment may also be adapted to serve as a golf cart by contouring the platform sections 100A, 100B to the shape of a golf bag.

Figure 14:
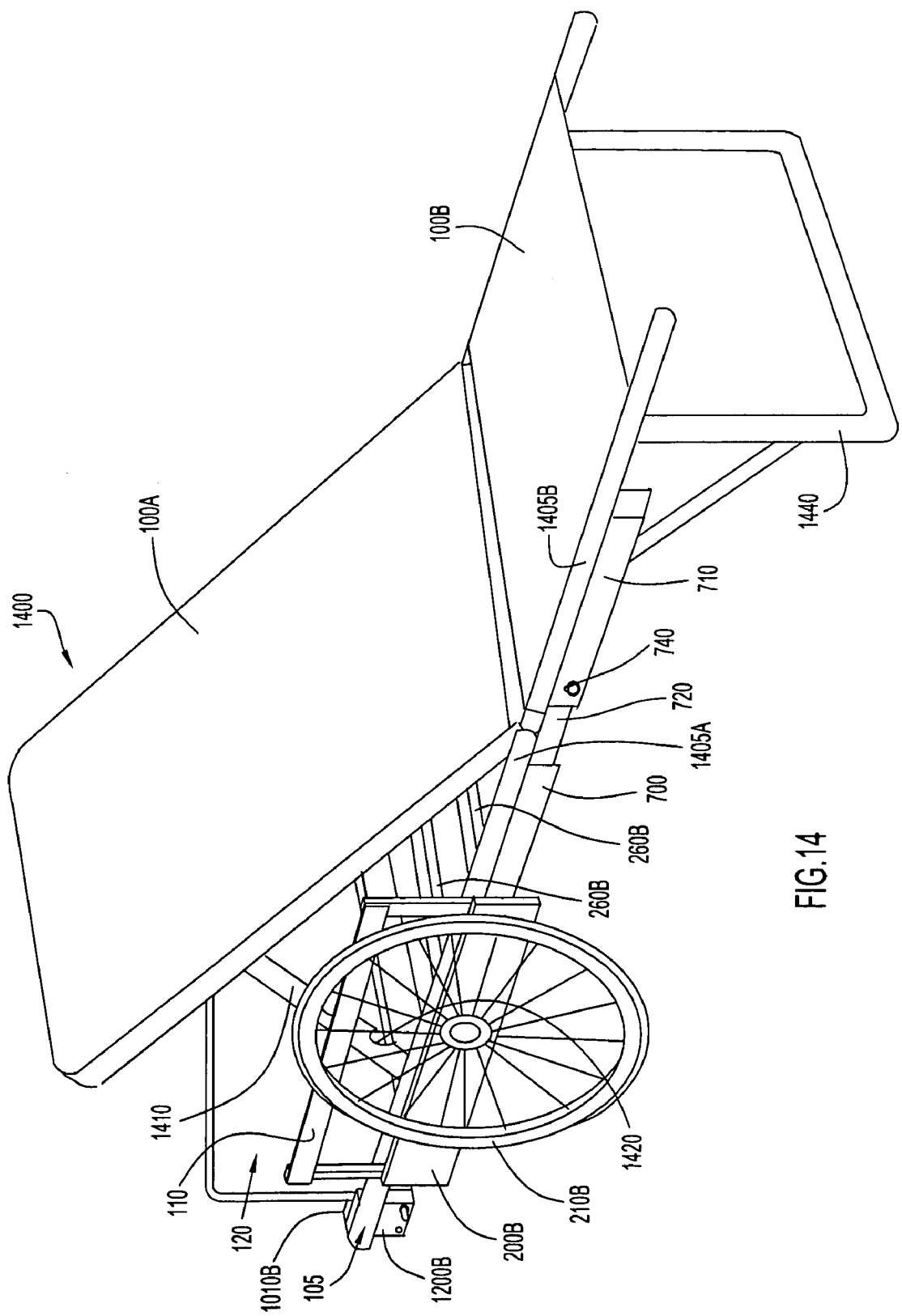
FIG. 14 illustrates a perspective of collapsible chair including the wheel assembly of the collapsible cart shown in FIG. 1.

Referring to FIG. 14 the cart 10 can also be integrated into a chair. As illustrated, the chair 1400 includes a support platform 100 coupled to a frame 105. The support platform is adapted to support a user in the seated position. For example, the first platform section 100A may define a seatback and the second platform section 100B may define a seat.

The frame includes a rear segment 1405A pivotally coupled to a front segment 1405B. The wheel assemblies 115A, 115B are attached to the underside of frame 105 (along the rear frame segment 1405A). The backstop 120 is pivotally coupled to one end of rear frame segment 1405A, while the first platform section 100A is pivotally coupled to the other end of the rear frame segment 1405A such that it pivots upward to a seating/backrest position. The second platform section 100B may be pivotally coupled to the first platform section 100A or to the front 1405B or rear 1405A frame segment (on the end that is opposite backstop 120). One or more bars 1410 including notches 1420 may be provided on the underside of the first platform section 100A to allow the first platform section 100A to be inclined at different heights to meet the comfort needs of the user of the chair 1400. The notch 1420 may engage a bar or rod disposed within the rear frame segment 1405A. In addition, conventional mechanisms may be utilized to provide reclining adjustment to the seatback (the first platform section) of the chair 1400.

The latch including tubes 700, 710 and the shaft 720 may be utilized to secure the rear 1405A and front 1405B frame segments in their deployed position. As shown, the first tube 700 is coupled to the rear frame segment 1405A and the second tube 710 is coupled to the front frame segment 1405B. The shaft is of sufficient length such that it is capable of bridging the tubes 700, 710 and is of sufficient strength to stably support the platform sections 100A, 100B during use. The shaft 720 may be secured within the second tube 710 via a pin fastener 740.

The chair 1400 may further include one or more folding leg assemblies 1440 on the underside of panel second platform section 100B that are adapted to folded out to serve as the legs of the chair. The chair 1400 may also include arms pivotally attached to the platform sections 100A, 100B or the frame segments 1405A, 1405B such that the arms fold down when the cart is being used to transport items and fold out and can be secured when the folding utility cart is being used as a chair.

Figure 15:
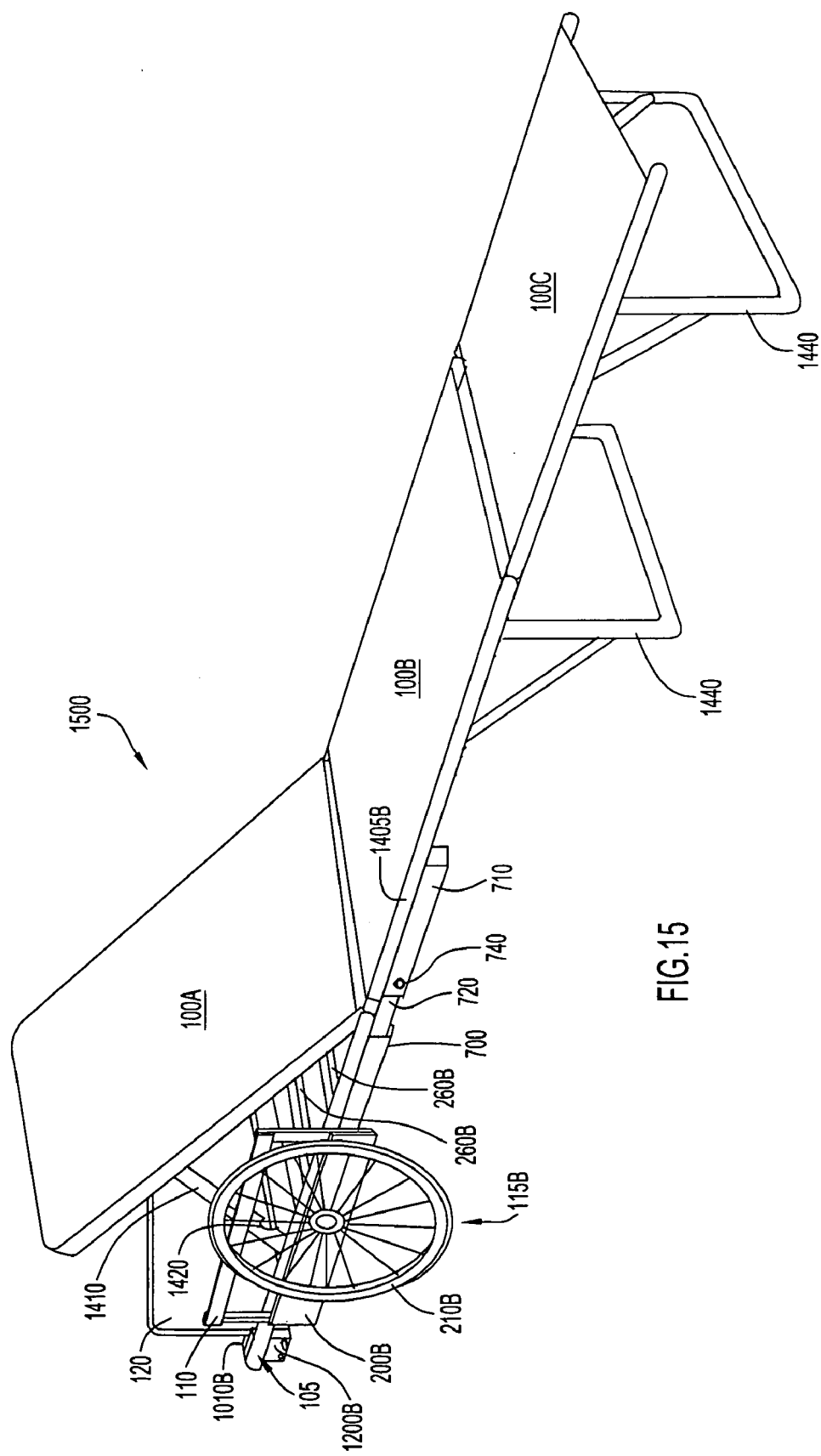
FIG. 15 illustrates a perspective view of a chaise lounge including the wheel assembly of the collapsible cart shown in FIG. 1.

Referring to FIG. 15, the cart may also be integrated into a chaise lounge 1500. As illustrated, the chaise lounge 1500 includes a support platform 100 coupled to a frame 105. The frame 105 includes a rear segment 1405A pivotally coupled to a front segment 1405B. The wheel assemblies 115A, 115B are attached to the underside of the frame 105 (along the rear frame segment 1405A). The backstop 120 is pivotally coupled to one end of rear frame segment 1405A, while the first platform section 100A is pivotally coupled to the other end of the rear frame segment 1405A such that it pivots upward to a seating/backrest position. The second platform section 100B may be pivotally coupled to the first platform section 100A or to the front 1405B or rear 1405A frame segment (on the end that is opposite backstop 120). One or more bars 1410 including notches 1420 may be provided on the underside of the first platform section 100A to allow the first platform section 100A to be inclined at different heights to meet the comfort needs of the user of the chaise lounge 1500. The notches 1420 may each engage a bar or rod disposed within the rear frame segment 1405A.

In addition, conventional mechanisms may be utilized to provide reclining adjustment to the seat back (the first platform section 100A) of the chaise lounge 1500. For example, the first platform section 100A may be coupled to the rear frame segment 1405A via a locking, ratchet-type mechanism. When the adjustment of first platform section 100A is stopped, the mechanism locks the first platform section 100A in place. To unlock the first platform section 100A, it is moved back and forth, which releases the locking mechanism and allows first section 100A to be folded against the frame 105 or the first section 100A to be readjusted.

The latch including tubes 700, 710 and the shaft 720 may be utilized to secure the rear and front frame segments in their deployed position. As shown, the first tube 700 is coupled to the rear frame segment 1405A and the second tube 710 is coupled to the front frame segment 1405B. The shaft 720 is of sufficient length such that it is capable of bridging the tubes 700, 710 and is of sufficient strength to stably support the platform sections 100A, 100B in their deployed positions during use. The shaft 720 may be secured in engaged or disengaged positions via a pin fastener.

A third platform section 100C (functioning as a footrest) may be pivotally coupled to the second platform section 100B. Utilizing three platform sections instead of two allows sufficient length to be obtained on which the user can lay or recline while minimizing the overall length of the when it is in a folded up position. In the same embodiment, the third platform section 100C may be attached to the second platform section 100B via the same type of locking ratchet mechanism previously described to first platform section 100A. In operation, when the chaise lounge 1500 is being used to transport items, the third platform section 100C folds on top of or is secured under the second platform section 100B and the backstop 120 projects perpendicularly to the first platform section 100A to prevent the items that are being transported from falling off the cart.

The chaise lounge 1500 may further include one or more folding leg assemblies 1440 on the underside of the second platform section 100B and or the third platform section 100C. The folding leg assemblies 1440 are adapted to fold outward, serving as the legs of the chair. The chaise lounge 1500 may also include arms pivotally attached to the platform sections 100A, 100B, 100C or the frame segments 1405A, 1405B such that the arms fold down when the cart is being used to transport items and fold out and can be secured when the folding utility cart is being used as a chair.

In other embodiments, additional tubes 700, 710 and shaft 720 mechanisms may be located on the underside of the frame 105 adjoining the second platform section 100B and the third platform section 100C so that the frame 105 forms a rigid unit with the second and third platform sections.

In some embodiments, the chair 1400 or chaise lounge 1500 may include a fold-out handle, which can used to push or pull the cart 10 during its use.

The above-described cart 10 overcomes the limitation of the prior art to achieve a relatively smaller width and more compactness by relying on slidable wheel assemblies that are secured to leg posts by pins or other means. When the cart 10 is desired to be folded up, the wheel assemblies are unsecured and slid down the leg posts, which are then folded so that the wheel assemblies 115A, 115B can lie in parallel or generally parallel planes. Another benefit of the cart 10 is that the wheels 210A, 210B, in their deployed position, do not need to be entirely underneath the frame of the cart. The wheels of prior art carts must be entirely underneath the frame of such carts due to their design, which increases the overall height of such carts when used with large diameter wheels. As a result, such carts may be difficult to manage when transporting items because they have a higher center of gravity and may tip over more easily.

The wheels 210A, 210B in the collapsible cart 10 described herein can extend above its support platform or frame so that larger diameter wheels can be used without increasing the height of the folding utility cart dramatically. This design also allows the cart 10 to be used for other applications, such as a chair or chaise lounger, in combination with large diameter wheels. Such applications may not be possible with previous carts because the overall height of the folding utility cart may be too great for the user to sit in comfortably or get in or out easily if used as a chair or chaise lounge.

Another advantage of the cart 10 is that fences 110 can be attached to the wheel assemblies 200A, 200B to prevent items being transported by the cart from falling off of the cart during transport. This also enables the use of the cart 10 described for additional applications such as a garden cart. Still another advantage the cart 10 described herein is the location of a backstop 120 at one end of the folding utility cart which extends in a direction that is perpendicular to the plane of the cart's support platform 100 or frame 105 when it is unfolded for use in carrying items. The items being transported or carried can be rested against the backstop to prevent them from falling off the cart 10. The backstop 120 is hinged or pivotally attached so that so that it can lay flat against the platform 100 or the frame 105 of the cart 10 when the cart is in a folded unit. A latch secures the backstop 120 in one place.

While the invention has been described in detail and with reference to specific embodiments thereof, it will be apparent to one skilled in the art that various changes and modifications can be made therein without departing from the spirit and scope thereof. For example, the number of wheel assemblies is not limited. While a two-wheeled cart is illustrated, carts including four or more wheel assemblies are contemplated.

The support platform 100 may possess any suitable dimensions and shape, and may be formed from any suitable material. The wheel frames 215A, 215B may be formed from any number of leg posts 220, 260. Instead of being joined by crosspieces 230, the leg posts may have expanded ends to keep sleeves 245 from sliding off the leg posts. The sleeves 245 may be made integral with the wheel panel 200A, 200B, or may be a separate component secured to the wheel panel. In embodiments in which the wheel assemblies 115A, 115B each comprise only one leg post 220, 260, the axles 310 may be attached directly to the leg sleeves 245 rather than to the wheel panel 200A, 200B. Similarly, the fence 110 may be attached to one or more of the sleeves 245.

The wheel panels 200A, 200B can be made of a variety of materials such as metal (steel or aluminum, for example), wood, plastic, or hard rubber. However, the material must be strong enough without collapsing, folding, buckling, or breaking to support the weight of the support platform 100 and support items being carried thereon, as well as to maintain the axles 310 in their positions.

The wheels 210A, 210B may be formed of any suitable materials and possess any suitable dimensions. While spoke wheels are illustrated (such as those used on bicycles), solid wheels may be utilized. A variety of materials such as metal (steel or aluminum, for example) or plastic can comprise the spokes and rim of the spoke wheel, and rubber or plastic could comprise the tread of the wheel. A variety of materials such as metal (steel or aluminum, for example), plastic, or rubber could comprise the entire wheel if it is a solid wheel. However, in each case, the wheels utilized must be strong enough without collapsing, folding, buckling or breaking to support the weight of the support platform 100 and the items to be carried on it. Additionally, if the collapsible cart is to be used as a chair, chaise lounge or in another utility, the wheels must be strong enough without collapsing, folding, buckling or breaking to support the weight of the support platform 100 and the item that will be resting or placed on it, such as a person.

The diameter of the wheels 210A, 210B can be varied and selected based on the surface over which the collapsible cart will transport items. Wheels with larger diameters may be desired for transporting items over loose surfaces such as sand or rough surfaces such as gravel. Likewise, the width of the tread of the wheels 210A, 210B can be varied to fit the particular circumstances of use. For instance, wheels with a wider tread would be desirable for use of the collapsible cart on loose surfaces such as sand. In instances where obstacles, such as stairs or roadway curbs, may be encountered, larger diameter wheels may be desired to negotiate such obstacles. Since the wheels 210A, 210B rest in parallel or approximately parallel planes that are not constrained by other aspects of the collapsible cart when folded, very large diameter wheels can be utilized if desired. The diameter of the wheels 210A, 210B may also be varied to achieve a desired degree of compactness. If the storage space for the collapsible cart is limited, then smaller diameter wheels can be utilized to reduce the width of the collapsible cart when folded. The diameter of the wheels 210A, 210B may also be varied according to other utilities for which the collapsible cart may be employed. If the cart is to be used as a chair or chaise lounge, it is desirable that the diameter of the wheels 210A, 210B allows the support platform 100 to be maintained at a height at which the user can easily get in and out of the chair or chaise lounge. In the case of the chair, the diameter of wheels 210A, 210B must also be such that the user can comfortably sit in the chair.

It may also be desirable to vary the height of the wheel panels 200A, 200B and the diameter of the wheels 210A, 210B so that the tops of the wheels do not extend above the surface of the support platform 100. In such embodiment, items to be transported can be placed on the collapsible cart so that portions of them can extend beyond the lateral edge of support platform 100 without hitting or being rubbed by wheels 210A, 210B. If standard bicycle wheels are used for wheels 210A, 210B, the diameter would generally be from twenty to twenty eight inches. However, bicycle wheels can also have diameters less than twenty inches. Solid wheels such as those used on children's wagons typically have diameters between eight and ten inches.

The proximal leg post portions 220A, 260A can be made of a variety of materials such as metal (steel or aluminum, for example), wood, plastic or rubber and must be strong enough without collapsing, folding, buckling or breaking to support the weight of the support platform 100 and the item that will be resting or placed on it. Furthermore, the proximal leg post portions 220A, 260A should be of sufficient strength and rigidity to maintain the fastening pin 300 in its position in the hole formed into the proximal leg post portions and into which the pin is inserted when the collapsible cart is deployed. Similarly, the distal leg post portions 220B, 260B can be made of a variety of materials such as metal (steel or aluminum, for example), wood, plastic or hard rubber and should be strong enough without collapsing, folding, buckling or breaking to support the weight of wheel assemblies 115 against the collapsible cart when it is folded.

It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration. Thus, it is intended that the present invention covers the modifications and variations of this invention provided they come within the scope of the appended claims and their equivalents.

I claim:

1. A collapsible, wheeled cart comprising:
   a platform operable to support an item;
   a first wheel assembly comprising:
      a first leg post having a proximal portion, a distal portion, and a pivot joint disposed between the proximal portion and the distal portion, and
      a first wheel coupled to the first leg post, the first wheel including a first wheel axis of rotation, wherein the first wheel is adapted to slide along the first leg post from the proximal portion to the distal portion, and vice versa; and a second wheel assembly comprising:
      a second leg post having a proximal portion, a distal portion, and a pivot joint disposed between the proximal portion and the distal portion, and
      a second wheel coupled to the second leg post, the second wheel including a second wheel axis of rotation, wherein the second wheel is adapted to slide along the second leg post from the proximal portion to the distal portion, and vice versa,
   wherein the first and second wheel assemblies are reconfigurable from a deployed position, in which the first and second wheel axes are oriented generally parallel to the platform, to a stowed position, in which the first and second wheel axes are oriented generally transverse to the platform.

2. The collapsible, wheeled cart of claim 1, wherein:
   the first wheel assembly further comprises a first sleeve mounted on the first leg post such that it is slidable along the first leg post;
   the first wheel is coupled to the first sleeve;
   the second wheel assembly further comprises a second sleeve mounted on the second leg post such that it is slidable along the second leg post; and
   the second wheel is coupled to the second sleeve.

3. The collapsible, wheeled cart of claim 2 further comprising:
   a first fence coupled to the first sleeve; and
   a second fence coupled to the second sleeve.

4. The collapsible, wheeled cart of claim 3, wherein:
   the support platform comprises a generally planar element;
   in the deployed position, the fences are positioned generally perpendicular to the support platform; and
   in the stowed position, the fences are positioned generally parallel to the support platform.

5. The collapsible, wheeled cart of claim 1, wherein:
   the proximal portion of the first leg post possesses a first length;
   the proximal portion of the second leg post possesses a second length; and
   the first length differs from the second length.

6. The collapsible, wheeled cart of claim 5, wherein the first length is shorter than the second length to position the first wheel between the support platform and the second wheel when the wheel assemblies are oriented in the stowed configuration.

7. The collapsible, wheeled cart of claim 1 further comprising a backstop rotatably coupled to the platform such that the backstop moves from a deployed position, in which the backstop is oriented generally perpendicular to the platform, to a stowed position, in which the backstop is oriented generally parallel to the platform.

8. The collapsible, wheeled cart of claim 1, wherein the platform comprises:
   a first platform section; and
   a second platform section operable to pivot with respect to the first platform section, wherein the first and second platforms are selectively reconfigurable in aligned and folded configurations.

9. The collapsible, wheeled cart of claim 8, wherein:
   the first platform section defines a seatback;
   the second platform section defines a seat; and
   the first platform pivots to alter the recline angle of the seatback.

10. The collapsible, wheeled cart of claim 8, wherein the second platform section further comprises folding legs operable to selectively support the second platform section on a supporting surface.

11. The collapsible, wheeled cart of claim 8, wherein the platform further comprises a third platform section operable to pivot with respect to the second platform section.

12. The collapsible, wheeled cart of claim 11, wherein the third platform section further comprises folding legs operable to selectively support the third platform section on a supporting surface.

13. The collapsible, wheeled cart of claim 1, wherein:
   in the deployed position, the wheel assemblies are located within their respective proximal leg portions; and
   in the stowed position, the wheel assemblies are located within their respective distal leg portions.

14. The collapsible, wheeled cart of claim 1 further comprising:
   a first platform fence operable to move from a stowed position to a deployed position;
   a second platform fence operable to move from a stowed position to a deployed position; and
   a backstop operable to move from a stowed position to a deployed position,
   wherein the fences and the backstop are selectively coupled when oriented in their deployed positions.

15. A collapsible, wheeled cart comprising:
   a platform operable to support an item;
   a first wheel assembly comprising:
      a first leg post having a proximal portion, a distal portion, and a pivot joint disposed between the proximal portion and the distal portion,
      a first fence coupled to the leg post, wherein the first fence is adapted to slide along the first leg post from the proximal portion to the distal portion, and vice versa, and
      a first wheel coupled to the first fence, the first wheel having a first wheel axis of rotation,
   a second wheel assembly comprising:
      a second leg post having a proximal portion, a distal portion, and a pivot joint disposed between the proximal portion and the distal portion,
      a second fence coupled to the second leg post, wherein the second fence is adapted to slide along the second leg post from the proximal portion to the distal portion, and vice versa, and
      a second wheel coupled to the second fence, the second wheel having a second wheel axis of rotation; and
   a backstop rotatably coupled to the platform such that the backstop moves from a deployed position, in which the backstop is oriented generally perpendicular to the platform, to a stowed position, in which the backstop is oriented generally parallel to the platform,
   wherein the first and second wheel assemblies are reconfigurable from a deployed position, in which the first and second wheel axes are oriented generally parallel to the platform, to a stowed position, in which the first and second wheel axes are oriented generally transverse to the platform.

16. The collapsible, wheeled cart of claim 15, wherein:
in the deployed position, the fences are positioned generally perpendicular to the support platform; and
in the stowed position, the fences are positioned generally parallel to the support platform.

17. The collapsible, wheeled cart of claim 16, wherein:
the proximal portion of the first leg post possesses a first length;
the proximal portion of the second leg post possesses a second length; and
the first length is shorter than the second length to position the first wheel between the support platform and the second wheel when the wheel assemblies are oriented in the stowed configuration.

18. A method of reconfiguring a collapsible cart, comprising:
(a) providing a wheeled, collapsible cart including:
a platform operable to support an item;
a first wheel assembly comprising:
a first leg post having a proximal portion, a distal portion, and a pivot joint disposed between the proximal portion and the distal portion; and
a first wheel coupled to the first leg post, the first wheel having a first wheel axis of rotation, wherein the first wheel is adapted to slide along the first leg post from the proximal portion to the distal portion, and vice versa; and
a second wheel assembly comprising:
a second leg post having a proximal portion, a distal portion, and a pivot joint disposed between the proximal portion and the distal portion; and
a second wheel coupled to the second leg post, the second wheel having a second wheel axis of rotation, wherein the second wheel is adapted to slide along the second leg post from the proximal portion to the distal portion, and vice versa;
(b) reorienting the first wheel assembly from a deployed position, in which the first wheel axis of rotation is oriented generally parallel to the platform, to a stowed position, in which the first wheel axis of rotation is oriented generally transverse to the platform; and
(c) reorienting the second wheel assembly from a deployed position, in which the second wheel axis of rotation is oriented generally parallel to the platform, to a stowed position, in which the second wheel axis of rotation is oriented generally transverse to the platform.

19. The method of claim 18, wherein:
(b) comprises (b.1) sliding the first wheel assembly from the proximal portion of the first leg post to the distal portion of the first leg post; and
(c) comprises (c.1.) sliding the second wheel assembly from the proximal portion of the second leg post to the distal portion of the second leg post.

20. The method of claim 18 further comprising:
(d) pivoting the distal portion of the first leg post with respect to the proximal portion of the first leg post; and
(e) pivoting the distal portion of the second leg post with respect to the proximal portion of the second leg post,
wherein the first wheel assembly is oriented generally parallel to the second wheel assembly in the deployed position.

21. The method of claim 20 further comprising (f) securing the distal portion of the first leg post to the distal portion of the second leg post.

22. The method of claim 18, wherein:
the platform comprises a first platform section and a second platform section; and
the method further comprises (d) pivoting the second platform section with respect to the first platform section.

23. The method of claim 22, wherein:
the first platform section defines a seatback;
the second platform section defines a seat; and
the method comprises (e) selectively pivoting the first platform section to alter the recline angle of the seatback.

24. The method of claim 18, wherein:
the cart further comprises a backstop rotatably coupled to the platform;
the method further comprises (d) rotating the backstop form a deployed position, in which the backstop is oriented generally perpendicular to the platform, to a stowed position, in which the backstop is oriented generally parallel to the platform.

* * * * *